Nov. 9, 1948.    R. A. HACKATHORN    2,453,432
CABLE CLAMP
Filed March 6, 1947
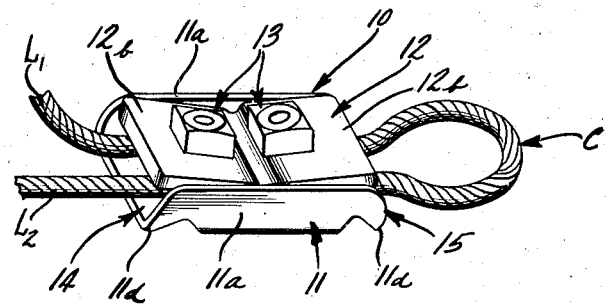
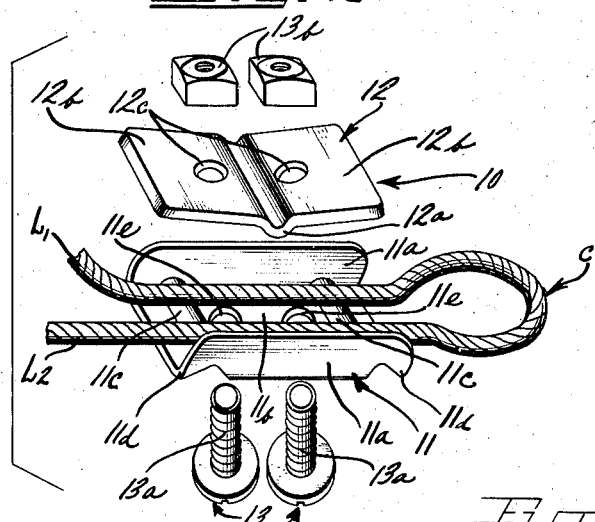
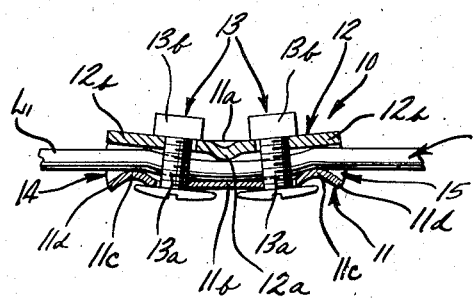
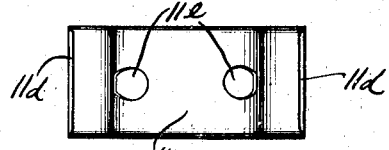
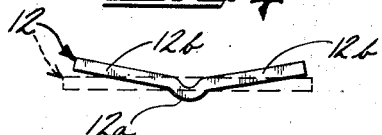
Inventor
ROBERT A. HACKATHORN Patented Nov. 9, 1948

2,453,432

UNITED STATES PATENT OFFICE 2,453,432

CABLE CLAMP

Robert A. Hackathorn, Grosse Pointe Woods, Mich., assignor to Crawford Door Company, Detroit, Mich., a corporation of Michigan Application March 6, 1947, Serial No. 732,747

1 Claim. (Cl. 24—135)

This invention relates to a clamp for anchoring flexible strand material such as ropes, cables, and the like.

Specifically the invention deals with a rope or cable clamp composed of a male and a female part, which are inexpensively formed by stamping operations on metal strip stock and will not bite or cut into a cable or rope while tightly gripping the same with a corrugating or wave-like effect.

The cable clamp of this invention is composed of a female part, a male part, and a pair of nut and bolt assemblies. The female part has a substantially flat web or back with upstanding longitudinal flanges along the length thereof. The web or back is stamped to raise transverse ribs or humps thereacross between the flanges and near the ends thereof. This stamping operation forms grooves in the outer face of the web and deflects the ends of the web to provide beveled inlet mouths. A pair of longitudinally aligned, spaced bolt holes are punched through the base or web of the female part between the transverse humps or ribs thereof. A male member is stamped from strip stock of a width sized for fitting between the flanges of the female member, and has a transverse hump or rib intermediate the ends thereof together with bolt holes on opposite sides of the humps. The stamping of the rib or hump is effected by forming a groove in the opposite face of the male member, and this stamping operation slightly deflects the male member to form inclined wings on opposite sides of the hump.

Two portions of a cable, such as the leg portions of a loop in the cable, are seated in the female member and held against lateral spreading by the flanges thereof. The bolts pass between the legs of the cable in the female member to separate them, and the male member is received on the bolts to cover the lengths of the cable in the female member. Nuts threaded on the bolts act on the male member to draw it toward the web or back of the female member, whereupon the transverse humps of the male and female members will cooperate to form a wave or corrugation in the confined lengths of the cable legs thereby tightly locking the legs against relative movement and maintaining the loop. Tightening of the nuts somewhat deflects the wings of the male member to flatten the same, and the inherent springiness of the metal of the male member resists this deflection to coact with the nuts in the nature of a lock washer, thereby eliminating the necessity for additional lock washer parts and at the same time providing a lock construction.

A feature of the invention resides in the provision of outwardly flared or beveled inlet and exit mouths on the clamp, so that no biting action on the cable strands will result, even though the cable rubs on the clamp parts. These beveled mouths are obtained by the stamping or embossing operations which form the gripping humps or ribs on the clamp parts, and no other operations are necessary.

Another feature of the invention resides in the provision of a rope or cable clamp having wave-line or corrugating gripping action without biting into the gripped members.

A further feature of the invention resides in the provision of inclined wings on a male gripping member which are adapted to be resiliently deflected under clamping pressures to serve as lock washers.

An object of the invention is to produce an inexpensive cable or rope clamp by stamping operations alone on conventional strip metal stock.

A still further object of the invention is to provide an inexpensive stamped metal cable clamp having hump-like ribs for producing a wave-line gripping action on the cable.

A specific object of the invention is to provide a cable clamp of the frictional grip type with beveled inlet and exit mouths that eliminate heretofore-encountered chafing action on cables or ropes.

Another specific object of the invention is to provide a cable or rope clamp composed of a stamped metal female part having longitudinal side flanges and transverse gripping ribs together with a male part fitting between the side flanges of the female part and having a transverse gripping rib with inclined resiliently deflectable wings on each side of the ribs for coacting with nut and bolt assemblies to be resiliently deflected thereby.

Other and further objects of the invention will be apparent to those skilled in the art from the following detailed description of the annexed sheet of drawings which, by way of a preferred example only, illustrates one embodiment of the invention.

On the drawings:

Figure 1 is a perspective view of the clamp showing the parts in assembled relationship on the two legs of a looped cable.

Figure 2 is an exploded perspective view showing the parts aligned for assembly on the cable.

Figure 3 is a longitudinal cross-sectional view of the clamp and cable assembly of Figure 1.

Figure 4 is a side elevational view of the male member of the clamp.

Figure 5 is a bottom plan view of the female member of the clamp.

As shown on the drawings:

In Figures 1 to 3 inclusive, the reference numeral 10 designates generally a clamp assembly according to this invention composed of a female part 11, a male part 12, and two nut and bolt assemblies 13. The cable clamp 10 is illustrated in Figures 1 and 2 in gripping relationship on the legs $L_1$ and $L_2$ of a looped cable C. The clamp holds these legs $L_1$ and $L_2$ in fixed position relative to each other for retaining the loop in the cable even when the loop is subjected to tension.

The female part 11 has longitudinal side flanges 11a, 11a on a back or web portion 11b. An open-ended channel is thus formed. The flanges 11a, 11a are spaced apart a sufficient distance for receiving the male part 12 therebetween. These side flanges 11a, 11a are at right angles to the back or base web 11b of the female part, and are sufficiently high so that the male member will be bounded thereby when acting on a cable or rope of the diameter for which the clamp was designed. It will be appreciated, of course, that the clamp can accommodate cables or ropes of many different diameters up to a maximum diameter wherein the male part will not lie between the flanges of the female part.

The female part 11 has transverse ribs 11c, 11c stamped thereon across the web 11b near the ends of the web. These ribs are hollow and therefore have recesses in the outer face of the web. The recesses, as shown in Figure 5, extend completely across the back face of the web and the stamping operation turns down lips 11d, 11d at the ends of the female part. These inclined lips are formed incidentally with the rib-forming embossing, or stamping operation.

The web 11b has a pair of holes 11e, 11e punched therethrough between the ribs 11c, 11c.

The entire female part 11 is inexpensively formed from metal strip stock by a stamping and punching operation.

The male part 12 is a rectangular metal piece conveniently stamped from metal strip stock of a width sized for fitting in the female part 11 between the flanges 11a, 11a thereof, and coextensive in length with the female part.

A transverse rib 12a is stamped across the central portion of the part 12 and is formed by raising or offsetting metal of the strip. This rib 12a, therefore, is hollow, and the part 12 has a groove in the face thereof opposite the rib. The rib is of rounded configuration and is free from sharp biting edges.

The stamping operation to form the rib 12a slightly inclines the strip on opposite sides of the rib to provide inclined wings 12b. These wings, as best shown in Figure 4, slope back from the rib face. A hole 12c is punched in each wing 12b. The holes 12c are on the longitudinal axis of the male part 12 in equally spaced relation from the rib 12a.

Each nut and bolt assembly 13 is composed of a headed bolt 13a and a nut 13b for threading on the shank of the bolt to engage a wing 12b of the male part 12.

As shown in Figure 2, the legs $L_1$ and $L_2$ of the cable C are laid between the flanges 11a of the female part on opposite sides of the holes 11e therein. These legs extend over the ribs 11c.

The male part 12 is inserted between the flanges 11a of the female part on top of the legs $L_1$ and $L_2$ of the cable, and its rib 12a engages the legs $L_1$ and $L_2$ between the parts engaged by the ribs 11c of the female part. The shanks of the bolts 13a are inserted through the holes 11e and 12c of the female and male parts respectively, and the nuts 13b are threaded on the projecting ends of the bolt shanks to engage the wings 12b of the male member. The nuts are then tightened against the wings to deflect the wings, causing them to assume a more flattened position than their originally unstressed inclined position. This flattening of the wings is resisted by the stiffness of the metal, and, since the metal is somewhat springy, it constantly presses against the nuts to prevent unauthorized loosening of the same. The inclined wing arrangement thereby avoids the necessity for using lock washers.

As the nut and bolt assemblies are tightened, to draw the male and female clamp parts together, the ribs on the respective clamp parts coact to have a corrugated or wave-like gripping action on the cable legs $L_1$ and $L_2$ as best shown in Figure 3. As therein shown, the cable legs are gripped on one side by two ribs, and on the other side by a single intermediate rib. The gripping action, however, is along a rounded or blunt hump, so that no biting into the cable strands will occur.

As shown in Figures 1 and 3, the clamp, when assembled in clamped relationship on the cable C, has beveled or flaring inlet and exit mouths 14 and 15 for the cable legs $L_1$ and $L_2$. Thus, the inclined wings 12b of the male member and the lips 11d of the female member diverge away from each other and provide a rounded entrance or exit for the cable legs so that they will not be chafed or cut as they swing or twist relative to the clamp. This feature is quite important, since the cable can rub on the clamp with no deleterious results.

The side flanges 11a, 11a of the female part 11 confine the cable legs $L_1$ and $L_2$ against lateral spreading and also receive the male member 12 therebetween to coact with the web 11b to hold the legs in the channel. The bolt shanks extend between these legs $L_1$ and $L_2$, thereby keeping them separated so that they cannot rub against each other. This arrangement protects the clamped lengths of the legs against chafing action, and further preserves the original condition of the cable.

From the above descriptions it will be understood that the invention affords an inexpensive stamped metal cable clamp that will not bite or otherwise injure a cable or rope, and that does not need locking washers to prevent unauthorized loosening of the assembly.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A clamp adapted for anchoring the legs of a looped cable or rope without damaging the same which comprises a female member having longitudinally extending side flanges on one side of a back web portion and coacting with the web portion to provide an open-ended channel, said web portion having hollow ribs extending transversely across the channel near the ends thereof, said ribs having rounded blunt contours, inclined lips on said web portion at the ends of the channel, a male plate member sized for fitting in said channel between said flanges of the female member, said male plate member having a hollow transverse rounded blunt rib across the midportion thereof together with inclined wings on opposite sides of the rib for coacting with said lips to form flaring mouths at the ends of the channel, said web portion of the female member having a pair of holes therethrough on the longitudinal axis thereof and between said ribs thereon, said male plate member having holes on opposite sides of the rib thereof and arranged for registration with the holes in the web, and nut and bolt assemblies adapted to cooperate with said male and female parts through said holes to draw the parts together to exert a corrugated or wave-like gripping action on a cable or rope in the channel while springing the wings of the male part against the nuts with lock washer effect.

ROBERT A. HACKATHORN.

REFERENCES CITED

The following references are of record in the file of this patent:

UNITED STATES PATENTS

| Number | Name | Date |
|---|---|---|
| 545,682 | Coram | Sept. 3, 1895 |
| 944,718 | Crosby | Dec. 28, 1909 |
| 1,103,056 | Kobert | July 14, 1914 |
| 1,196,163 | Simmon | Aug. 29, 1916 |
| 1,321,660 | Moriarty | Nov. 11, 1919 |
| 1,730,197 | Elsey | Oct. 1, 1929 |
| 2,426,859 | Case | Sept. 2, 1947 |

FOREIGN PATENTS

| Number | Country | Date |
|---|---|---|
| 20,138 | France | July 22, 1916 |